United States Patent
Hsiao et al.

(10) Patent No.: US 9,531,285 B2
(45) Date of Patent: Dec. 27, 2016

(54) PFC POWER SYSTEM WITH POWER MANAGED MAIN AND STANDBY VOLTAGE OUTPUTS

(71) Applicant: Chicony Power Technology Co., Ltd., New Taipei (TW)

(72) Inventors: Yung-Hung Hsiao, New Taipei (TW); Hao-Te Hsu, New Taipei (TW); Hung-Yi Wu, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/969,934

(22) Filed: Dec. 15, 2015

(65) Prior Publication Data

US 2016/0099637 A1 Apr. 7, 2016

Related U.S. Application Data

(63) Continuation-in-part of application No. 13/960,408, filed on Aug. 6, 2013, now Pat. No. 9,246,396.

(51) Int. Cl.
*H02M 3/335* (2006.01)
*H02M 1/00* (2006.01)
*H02M 1/32* (2007.01)

(52) U.S. Cl.
CPC ..... *H02M 3/33576* (2013.01); *H02M 3/33523* (2013.01); *H02M 3/33553* (2013.01);
(Continued)

(58) Field of Classification Search
CPC .... H02M 1/42; H02M 1/4208; H02M 1/4241; H02M 1/4258; H02M 3/335; H02M 3/33507; H02M 3/3353; H02M 3/33538; H02M 3/33546; H02M 3/33561
(Continued)

(56) References Cited

U.S. PATENT DOCUMENTS 5,905,491 A 5/1999 Kim
6,031,748 A 2/2000 Hong
(Continued)

FOREIGN PATENT DOCUMENTS

CN 1925298 A 3/2007
TW M361185 7/2009
(Continued)

*Primary Examiner* — Jeffrey Sterrett
(74) *Attorney, Agent, or Firm* — Muncy, Geissler, Olds & Lowe, P.C.

(57) ABSTRACT

A power system is disclosure. The power system includes a processor, a power supply device, and a power-managing module. The power supply device includes a converter and a controller, the converter has a main power output for outputting a main voltage and a standby power output for outputting a standby voltage, and the controller is electrically connected to the converter. The power-managing module is communicating with the electronic device and the power supply device and includes a switch and a power manager, the switch is electrically connected to the main power output and the electronic device, and the power manager is electrically connected to the electronic device, the switch, and the controller. When the electronic device is in a standby operation mode, the power manager makes the switch turn off to prevent to main voltage from conducting to the electronic device.

12 Claims, 4 Drawing Sheets

(52) U.S. Cl.
CPC ........ *H02M 1/32* (2013.01); *H02M 2001/007* (2013.01); *H02M 2001/0032* (2013.01); *H02M 2001/0058* (2013.01); *Y02B 70/1433* (2013.01); *Y02B 70/1491* (2013.01); *Y02B 70/16* (2013.01)

(58) Field of Classification Search
USPC .................. 363/20, 21.01, 21.02, 89, 95, 97
See application file for complete search history.

(56) References Cited

U.S. PATENT DOCUMENTS

| | | | |
|---|---|---|---|
| 6,362,980 | B1 | 3/2002 | Ohashi et al. |
| 7,471,527 | B2 | 12/2008 | Chen |
| 7,532,494 | B2 | 5/2009 | Louvel et al. |
| 7,856,566 | B2 | 12/2010 | Orr |
| 7,885,085 | B2 | 2/2011 | Orr et al. |
| 8,194,419 | B2 | 6/2012 | Ryu et al. |
| 8,242,628 | B2 * | 8/2012 | Ger .................... H02M 1/4225 307/17 |
| 8,247,922 | B2 | 8/2012 | Ger et al. |
| 9,246,396 | B2 * | 1/2016 | Hsiao ................ H02M 3/33523 |
| 2008/0218503 | A1 | 9/2008 | Lee |
| 2009/0316455 | A1 | 12/2009 | Kim et al. |
| 2011/0141776 | A1 * | 6/2011 | Lin ........................ H02H 7/125 363/53 |
| 2012/0020131 | A1 * | 1/2012 | Chan ....................... H02J 9/005 363/126 |
| 2012/0147631 | A1 | 6/2012 | Nate |
| 2012/0294046 | A1 | 11/2012 | Nate et al. |
| 2013/0128623 | A1 | 5/2013 | Hosotani |
| 2014/0204639 | A1 * | 7/2014 | Wu ..................... H02M 1/4225 363/89 |
| 2014/0368742 | A1 | 12/2014 | Joo et al. |
| 2015/0003122 | A1 | 1/2015 | Cui et al. |
| 2015/0043248 | A1 | 2/2015 | Hsiao et al. |
| 2016/0028322 | A1 * | 1/2016 | Wang ........................ H02J 1/00 363/89 |
| 2016/0099637 | A1 * | 4/2016 | Hsiao ................ H02M 3/33576 363/44 |
| 2016/0141951 | A1 * | 5/2016 | Mao ........................ H02M 1/36 363/21.02 |

FOREIGN PATENT DOCUMENTS

| | | |
|---|---|---|
| TW | M363021 U1 | 8/2009 |
| TW | M397546 | 2/2011 |
| TW | M398290 | 2/2011 |
| TW | 201113858 A | 4/2011 |
| TW | 201122794 A1 | 7/2011 |
| TW | I381621 B1 | 1/2013 |

* cited by examiner

PFC POWER SYSTEM WITH POWER MANAGED MAIN AND STANDBY VOLTAGE OUTPUTS

CROSS-REFERENCE TO RELATED APPLICATION

This application is a Continuation-in-Part of application Ser. No. 13/960,408 filed on Aug. 6, 2013. The entire disclosure is incorporated herein by reference.

BACKGROUND OF THE INVENTION

Field of the Invention

The present invention relates to a power system, and in particular to a power system which has very low power consumption in a standby operation mode.

Description of Related Art

The commercial power supply device is designated to meet the power required for operation of the electronic device under standby mode and normal mode (or called non-standby mode), when the electronic device operates at normal mode or standby mode, it is easily for the power device including two converters to switch the power outputted therefrom to meet the power required for operation of the electronic device. More particularly, one of the converters is employ in providing a main voltage when the electronic device is in the normal operation mode, and the other converter is employ in providing a standby voltage when the electronic device is in the normal operation mode and the standby operation mode. Briefly, when the electronic device is in the standby mode, one of the converters is switched off to achieve the function of low power consumption.

However, the power supply device having two converters is bulk, and the efficiency thereof in the standby operation mode is poor since one of the converters is inactivated. Therefore it is desirable to use a converter design for the power supply device which operates with a high efficiency not only under normal mode, but also for standby mode.

SUMMARY OF THE INVENTION

According to one aspect of the present disclosure, a power system includes an electronic device, a power supply device, and a power-managing device. The power supply device includes a converter and a controller, the converter has a main power output for outputting a main voltage and a standby power output for outputting a standby voltage, wherein the standby power output is electrically connected to the electronic device. The controller is electrically connected to the converter. The power-managing module is communicating with the electronic device and the power supply device and includes a switch and a power manager. The switch is arranged between the converter and the electronic device and electrically connected to the main power output and the electronic device. The power manager is electrically connected to the electronic device, the switch, and the controller. When the electronic device is operated in a standby operation mode, the power manager makes the switch turn off to stop conducting the main voltage to the electronic device.

According to another aspect of the present disclosure, a power system includes a power supply device and an electronic device. The power supply device includes a converter, a controller, and a power manager, the converter has an output, the controller is electrically connected to the converter, and the power manager is electrically connected to the converter and the controller. The electronic device includes a switch and a processor, and the switch is arranged between the converter and the processor and coupled to the output of the converter and the processor. The processor is electrically connected to the output of the converter and the switch, wherein a voltage sent from the output of the converter is separated into a standby voltage and a main voltage when entering the electronic device, the standby voltage is conducted to the processor, and the main voltage is conducted to the processor when the switch is turned on. When the electronic device is operated in a standby operation mode, the power manager makes the switch turn off to stop conducting the main voltage to the processor.

According to further another aspect of the present disclosure, a power system includes a power supply device and an electronic device. The power supply device includes a converter and a controller, the converter has an output, and the controller is electrically connected to the converter. The electronic device includes a switch, a processor, and a power manager. The switch is electrically connected to the output of the converter, the processor is electrically connected to the output and the switch, wherein a voltage sent from the output of the converter is separated into a standby voltage and a main voltage when entering the electronic device, the standby voltage is conducted to the processor, and the main voltage is conducted to the processor when the switch is turned on. The power manager is electrically connected to the converter, the switch, the processor, and the controller. When the electronic device is operated in a standby operation mode, the power manager makes the switch turn off to stop conducting the main voltage to the processor.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 1:
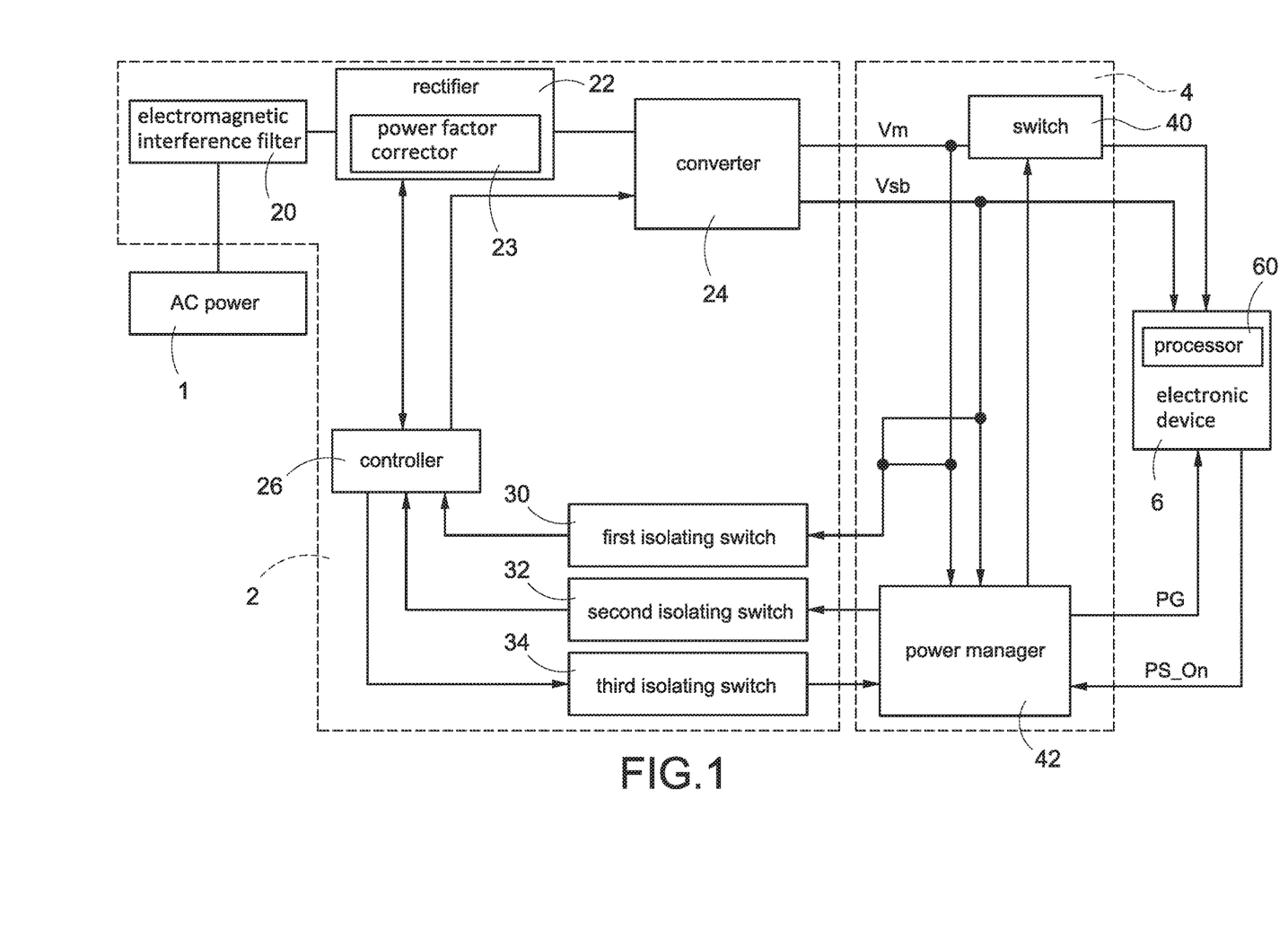
FIG. 1 is a circuit block diagram of a power system according to a first embodiment of the present invention.

Reference is made to FIG. 1, which is a circuit block diagram of a power system according to a first embodiment of the present invention. In FIG. 1, the power system (its reference numeral is omitted) is electrically connected to an alternative current (AC) power 1 and includes a power supply device 2, a power manager 4, and an electronic device 6.

The electronic device 40 is operated in a standby operation mode and a normal operation mode (or called non-standby operation mode). Specifically, when the electronic device 6 is in the standby operation mode, most of the circuits thereof are switched off, and only the processor 60 and receiver (not shown) connected to the processor 60 are operating, for allowing users to switch the electronic device 6 between the standby operation mode and the normal operation mode, thus the power consumption of the power supply device 2 for providing power to the electronic device 6 in the standby operation mode is very low. On the contrary, when the electronic device 6 is in the normal operation mode, the power supply device 2 has to provide full power with a high efficiency for the operation of the electronic device 6.

The power supply device 2 includes electromagnetic interference filter 20, a rectifier 22, a converter 24, and a controller 26. The electromagnetic interference filter 20 is electrically connected to the AC power 1 and is configured to filter electromagnetic noise within the AC power 1.

The rectifier 22 is electrically connected to the electromagnetic interference filter 20. The rectifier 22 is configured to rectify the AC power 1 which the electromagnetic noise is filtered to a rectified power without power factor correction. The rectifier 20 is, for example, a bridge rectifier.

The power supply device 20 may further includes a power factor corrector 23 electrically connected to the converter 24. The power factor corrector 23 is configured to ensure that the input current of the rectified power follows voltage of the rectified power in time and amplitude proportionally (i.e. the input voltage and current of the rectified power are maintained in phase relative to each other). The power factor corrector 23 can be an active type power factor corrector or a passive type power factor corrector, wherein the active type power factor corrector and the passive type power factor corrector are categorized based on whether active switch is included. The active type power factor corrector uses active switch (such as metal-oxide-semiconductor field-effect transistor, MOSFET) and circuit for controlling the active switch automatically corrects the input current. In contrast, the passive type power factor corrector performs power factor correction with only passive components, such as capacitors and inductors, at the input to correct poor power factor. The passive power factor corrector includes simplicity, cost effectiveness especially at low power. The active type power factor corrector yields a power factor higher than that of the passive power factor corrector, thus the performance of the active type power factor corrector is better than that of the passive power factor corrector. It should be noted that the power factor corrector 23 shown in FIG. 1 is arranged within the rectifier 22; however, in the practical application, the power factor corrector 23 can be arranged between the rectifier 22 and the converter 24 and electrically connected thereto, and is configured to ensure that the input current of the rectified power follows voltage of the rectified power in time and amplitude proportionally.

The converter 24 is electrically connected to the rectifier 22 and is configured to regulate the rectified power with power factor correction (as the "Bulk Voltage" signal shown in the FIG. 2) for providing a main voltage Vm and a standby voltage Vsb. The converter 24 is, for example, a direct current (DC) to DC converter, and can be an LLC resonant converter, a dual forward converter, or a signal forward converter. The converter 24 includes a main power output for conducting the main voltage Vm and a standby power output for conducting the standby voltage Vsb. The potential level of the standby voltage Vsb can be different from that of the main voltage Vm. However, the potential level of the standby voltage Vsb can be the same as that of the main voltage Vm during the value of the current flowing through the main power output is different from that of flowing through the standby power output.

The controller 26 is electrically connected to the power factor corrector 23, the converter 24, and the power-managing module 4. The controller 26 is configured to control the operations of the power factor corrector 23 and the converter 24, thus the potential levels of main voltage Vm and the standby voltage Vsb can be regulated. More particularly, the controller 26 generates a controlling signal, such as a pulse width modulating signal, according to the operations of the converter 24 and the power-managing module 4, and then modulates the duty cycle of the controlling signal for regulating the potential level of the main voltage Vm and the standby voltage Vsb.

The power-managing module 4 is arranged between the power supply device 2 and the electronic device 6, and includes a switch 40 and a power manager 42. The switch 40 is arranged between the main power output and the electronic device 6 and coupled thereto. The power manager 42 is electrically connected to the converter 24, the controller 26, the switch 40, and the electronic device 6. The power manager 42 includes a signal-outputting terminal for transmitting a power-good (PG) signal to the electronic device 6 and the signal-receiving terminal for transmitting a power-supply-device-on (PS_On) signal. Specifically, the signal-outputting terminal and the signal-receiving signal of the power manager 42 are electrically connected to the electronic device 6, the PG signal is sent from the power manager 42 to the electronic device 6 via the signal-outputting terminal, for indicating that the power supply device 2 is ready for providing the main voltage Vm and the standby voltage Vsb, and the PS_On signal is sent from the electronic device 6 to the power manager 42 via the signal receiving terminal, for indicating that the electronic device 6 is operated in the normal operation mode or in the standby operation mode.

The power supply device 2 further includes a first isolating switch 30, a second isolating switch 32, and a third isolating switch 34 coupled between the converter 24, the controller 26, and the power manager 42. Specifically, the input (or called the signal generating end) of the first isolating switch 30 is connected to the main power output and the standby power output of the converter 24, and the output (or called the signal detecting end) thereof is connected to the controller 26. The first isolating switch 30 is configured to isolate-transmit signals corresponding to the potential levels of the main voltage Vm and/or the standby voltage Vsb to the controller 26, thus a function of over-voltage protection is provided, wherein when at least one of the main voltage Vm and the standby voltage Vsb is higher than preset voltages, the controller 26 modules the duty cycle for lower the main voltage Vm and/or the standby voltage Vsb or stops conducts the main voltage Vm and standby voltage Vsb to prevent the electronic device 6 from damage.

Moreover, the input of the second isolating switch 32 is connected to the power manager 42, and the output thereof is connected to the controller 26. The power manager 42 detects currents flowing through the main power output and the standby power output, and generates a current-detecting signal for indicating whether the detected currents are high than preset values or not. The current-detecting signal is then transmitted to the controller 26 after passing through the second isolating switch 32 to provide a function of over-current protection, wherein when at least one of the currents flowing through the main power output and the standby power output is higher than preset values, the controller 26 modules the duty cycle for lower the current(s) or stops conducts the main voltage Vm and standby voltage Vsb to prevent the electronic device 6 from damage.

Furthermore, the input of the third isolating switch 34 is connected to the controller 26, and the output thereof is connected to the power manager 42. When the power supply device 2 is activated and the rectified voltage with power factor correction is higher than a default voltage, the controller 26 generates a power-good-input signal (PGI signal) and sends the PGI signal to the power manager 42 after passing through the third isolating switch 34.

Each of the first isolating switch 30, the second isolating switch 32, and the third isolating switch 34 includes at least one photo-coupler having a light emitting diode (LED) arranged at the input and a photodetector arranged at the output for isolating the signal of the output stage of the power system from the input stage thereof.

Figure 2:
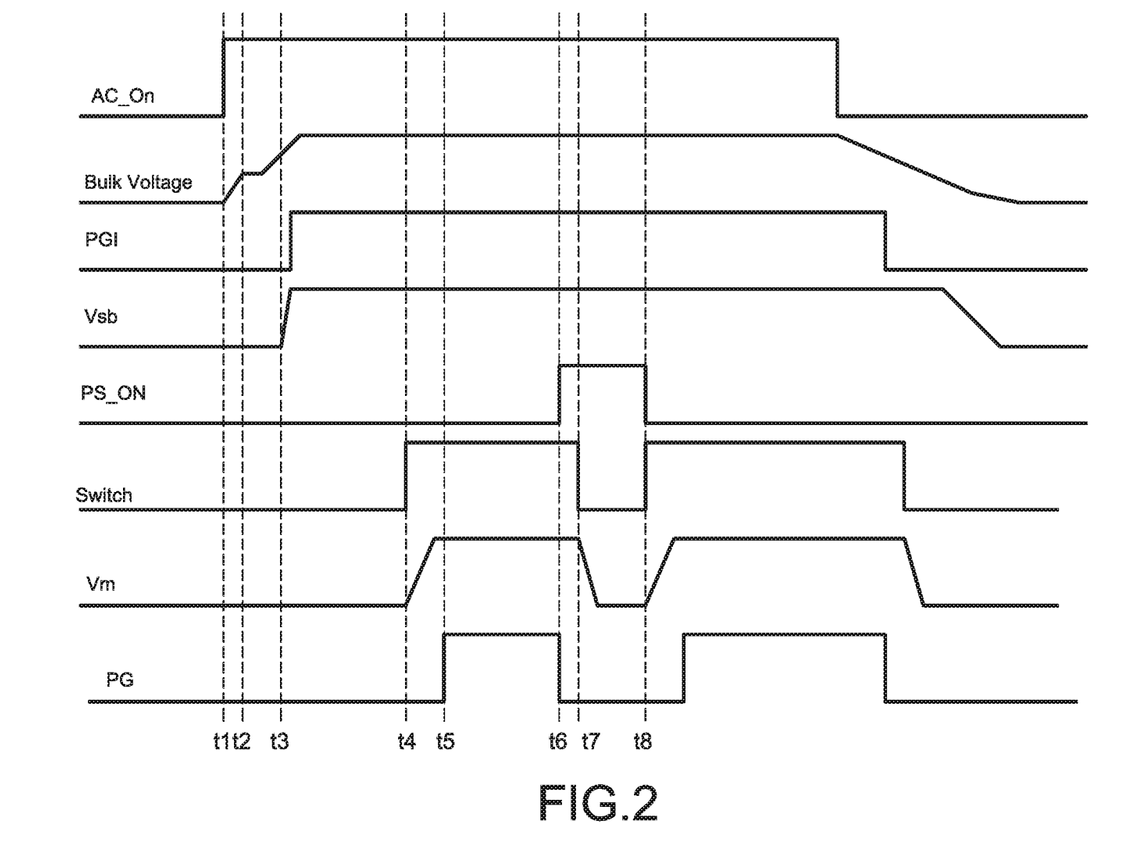
FIG. 2 is a timing diagram illustrating operations of the power supply device and the power manager.

Reference is made to FIG. 2, which is a timing diagram illustrating operations of the power supply device 2, the switch 40, and the power-manager 42. The power supply device 2 receives the AC power 1 while the AC_On signal is at the logic high level (as time t1 shown in FIG. 2), and the electronic device 6 is in the normal operation mode at the PS_On signal is at the logic low level (as time t1 to t5 shown in FIG. 2) and in the standby operation mode when the PS_On signal is at the logic high level (as time t6 to t8 shown in FIG. 2). The signal "Bulk Voltage" represents the rectified voltage with power factor correction regulated by the power factor corrector 23, and the standby voltage (Vsb) is generated and conducted to the electronic device 6 while the rectified voltage with power factor correction is higher than the default voltage (as shown at the time t3 in FIG. 2). At time t1 to t4, the switch 40 turns off since the signal "Switch" is at the logic low level; however, at time t4 to t7, the switch 40 is turned on, since the signal "Switch" is at logic high level. The main voltage (Vm) is generated and conducted to the electronic device 6 while the PS_On signal is at the logic low level and the switch 40 is turned on.

Instead of turning off the switch 40 as the PS_On signal is switched from the logic low level to the logic high level for indicating that the electronic device 6 is switch from the normal operation mode to the standby operation mode, the switch 40 is turned off after few times after the PS_On signal is in the logic high level (as shown at time t6 to t7). Therefore, the electronic device 6 can perform a file or program storing procedure in the meanwhile to prevent operation data of the electronic device 6 being lost. However, the switch 40 is immediately turned on at the time when the PS_On signal is switch from the logic high level to the logic low level for indicating that the electronic device 6 is switch from the standby operation mode to the normal operation mode (as shown at time t8). It should be noted that the standby voltage Vsb is not only provided when the electronic device 6 is in the standby operation mode but also in the normal operation mode, and the main voltage Vm is provides when the electronic device 6 is in the normal mode operation.

Figure 3:
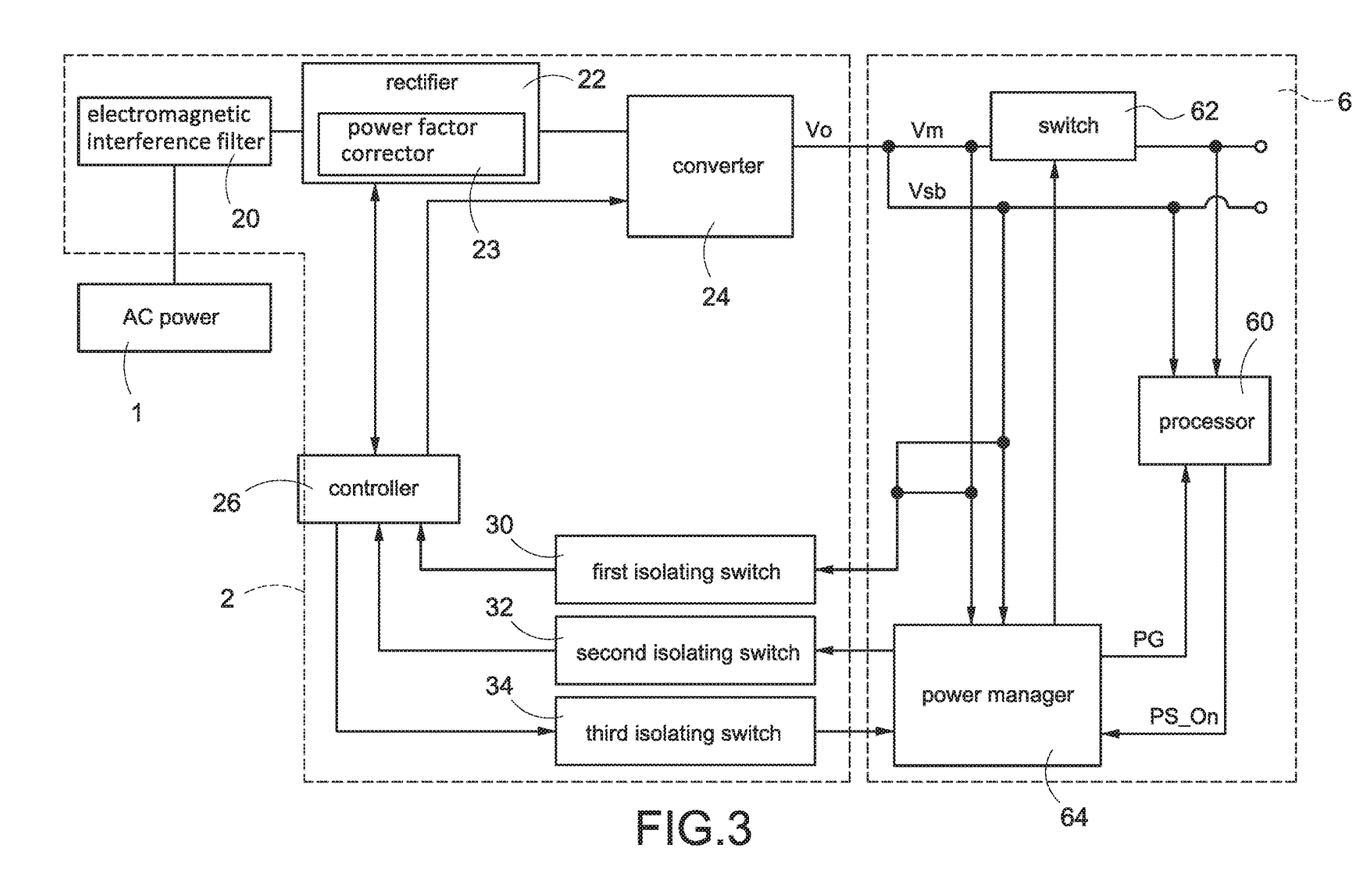
FIG. 3 is a circuit block diagram of a power system according to a second embodiment of the present invention.

The power system is therefore suitable to be constructed as a compact and cost efficient device, which includes a standby operation mode with low power consumption. Reference is made to FIG. 3, which is a circuit block diagram of a power system according to a second embodiment of the present invention. In FIG. 3, the power system is electrically connected to an AC power 1 and includes a power supply device 2 and an electronic device 6, the power supply device 2 is arranged between the AC power 1 and the electronic device 6, and is configured to regulate the AC power 1 to the DC power.

The power supply device 2 includes an electromagnetic interference filter 20, a rectifier 22, a converter 24, and a controller 26. The electromagnetic interference filter 20 is connected to the AC power 1 and configured to filter electromagnetic noise within AC power 1. The rectifier 22 is arranged between the electromagnetic filter 20 and the converter 24 and electrically connected thereto. The rectifier 22 is configured to rectify the AC power which the electromagnetic noise is filtered to a rectified power without power factor correction. The rectified power without power factor correction then enters a power factor corrector 23 configured to ensure that the input voltage and current of the rectified power are maintained in phase relative to each. The rectified power with power factor correction outputted form the power factor corrector 23 is conducted to the converter 24. The converter 24 regulates an output power Vo and conducts the output power Vo to the electronic device 6.

The electronic device 6 includes and a processor 60, a switch 62, and the power manager 64, the switch 62 is arranged between the converter 24 and the processor 60 and receives the output voltage Vo regulated by the converter 24. The output voltage Vo sent from the output of the converter 24 is separated into a standby voltage Vsb and a main voltage Vm when entering the electronic device 6, the standby voltage Vsb is conducted to the processor 60 when the rectified voltage with power factor correction is higher than the default voltage, and the main voltage Vm is conducted to the processor 60 when the switch 62 is turned on. The processor 60, the switch 62, and the power manager 64 may be mounted on a motherboard (not shown) of the electronic device 6, and electronic device 6 has other circuits for achieve the functions, such as displaying and inputting, mounted on the motherboard.

The processor 60 is electrically connected not only to the switch 42 but also the converter 24 of the power supply device 2. The standby voltage Vsb is provided not only when the electronic device 6 is in the standby mode but also when the electronic device 6 is in the normal operation mode. When the electronic device 6 is in the standby operation mode, the power manager 64 makes the switch 62 turn off to prevent the main voltage Vm from conducting to the processor 60 and other circuits (not shown) of the electronic device 6. However, when the electronic device 6 is in the normal mode operation, the power manager 28 makes the switch 62 turn on to conduct the main voltage Vm to the processor 60 and other circuits of the electronic device 6. It should be noted that, the potential level of the main voltage Vm may be the same as that of the standby voltage Vsb; however, the potential level of the standby voltage Vsb may further be regulated to be different form that of the main voltage Vm by a regulator (not shown) arranged between the converter 24, the processor 60, and the other circuits of the electronic device and electrically connected thereto.

The power supply device 2 may further includes a first isolating switch 30, a second isolating switch 32, and a third isolating switch 34. The first isolating switch 30 is coupled between the converter 24, the controller 26, and the power manager 64, and is configured to isolate-transmit signals corresponding to the main voltage Vm and the standby voltage Vsb to the controller 26 when the main voltage Vm or the standby voltage Vsb is higher than preset voltages, thus a function of over-voltage protection is provided.

The second isolating switch 32 is coupled between the converter 24, the controller 26, and the power manager 64. The power manager 64 detects the currents conducting to the processor 60 and the switch 62 respectively, and sends a signal for indicating that at least one of the detected currents is higher than preset currents to the controller 26 after passing through the second isolating switch 32 to achieve a function of over-current protection.

The third isolating switch 36 is coupled between the controller 26, and the power manager 64. When the power supply device 2 is activated and the rectified voltage with power factor correction is higher than a default voltage, the controller 26 generates the PGI signal and sends the PGI signal to the power manager 64 after passing through the third isolating switch 34.

The operation of the power supply device 2, the switch 62, and the power manager 64 is the same as that mentioned in the first embodiment, and the power system of this embodiment can achieve the functions as the power system mentioned in the first embodiment.

Figure 4:
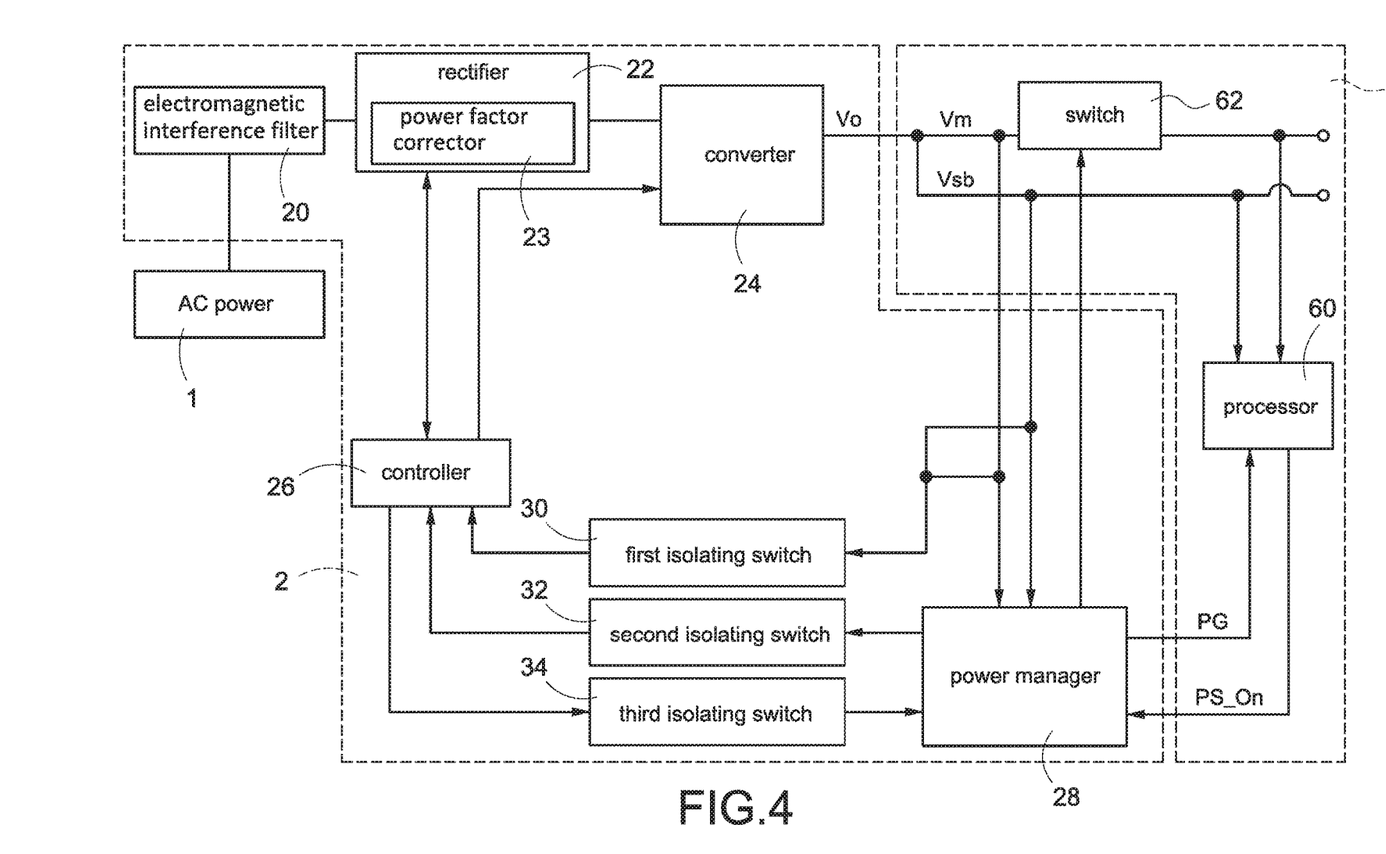
FIG. 4 is a circuit block diagram of a power system according to a third embodiment of the present invention.

Reference is made to FIG. 4, which is a circuit block diagram of a power system according to a third embodiment of the present invention. The power system is electrically connected to an AC power 1 and includes a power supply device 2 and an electronic device 6, the power supply device 2 is arranged between the AC power 1 and the electronic device 6, and is configured to regulate the AC power 1 to DC power.

The power supply device 2 includes an electromagnetic interference filter 20, a rectifier 22, a converter 24, a controller 26, and a power manager 28. The electromagnetic interference filter 20 is connected to an AC power and configured to filter electromagnetic noise within AC power. The rectifier 22 is arranged between the electromagnetic filter 20 and the converter 24 and electrically connected thereto. The rectifier 22 is configured to rectify the AC power which the electromagnetic noise is filtered to a rectified power without power factor correction. The rectified power without power factor correction then enters a power factor corrector 23 configured to ensure that the input voltage and current of the rectified power are maintained in phase relative to each other. The rectified power with power factor correction is conducted to the converter 24, and the converter 24 regulates an output power Vo and conducts the output power Vo to the electronic device 6. The power manager 28 is electrically connected to the converter 24, the controller 26, and the electronic device 6.

The electronic device 6 includes and a processor 60 and a switch 62, the switch 62 is arranged between the converter 24 and the processor 60 and receives the output voltage Vo regulated by the converter 24. The output voltage Vo sent from the output of the converter 24 is separated into a standby voltage Vsb and a main voltage Vm when entering the electronic device 6, the standby voltage Vsb is conducted to the processor 60 when the rectified voltage with power factor correction is higher than the default voltage, and the main voltage Vm is conducted to the processor 60 when the switch 62 is turned on. The processor 60 and the switch 62 may be mounted on a motherboard (not shown) of the electronic device 6, and electronic device 6 has other circuits for achieve the functions, such as displaying and inputting, mounted on the motherboard.

The processor 60 is electrically connected not only to the switch 42 but also the output of the converter 24. When the electronic device 6 is in the standby operation mode, the power manager 28 makes the switch 62 turn off to prevent the main voltage Vm from conducting to the processor 60 and other circuits (not shown) of the electronic device 6. However, when the electronic device 6 is in the normal mode operation, the power manager 28 makes the switch 62 turn on to conduct the main voltage Vm to the processor 60 and other circuits of the electronic device 6.

The power supply device 2 further includes a first isolating switch 30, a second isolating switch 32, and a third isolating switch 34. The first isolating switch 30 is coupled between the converter 24, the controller 26, and the power manager 28, and is configured to isolate-transmit signals corresponding to the voltages for conducting to the processor 60 and the switch 62 to the controller 26, and providing a function of over-voltage protection.

The second isolating switch 32 is coupled between the converter 24, the controller 26, and the power manager 28. The power manager 28 detects the currents flowing through the processor 60 and the switch 62 respectively, and sends a signal for indicating that at least one of the detected currents is higher than preset currents to the controller 26 after passing through the second isolating switch 32 to achieve a function of over-current protection.

The third isolating switch 34 is coupled between the converter 24, the controller 26, and the power manager 62. When the power supply device 2 is activated and the rectified voltage with power factor correction is higher than a default voltage, the controller 26 generates the PGI signal and sends the PGI signal to the power manager 62 after passing through the third isolating switch 34.

The operation of the power supply device 2, the switch 62, and the power manager 28 is the same as that mentioned in the first embodiment, and the power system of this embodiment can achieve the functions as the power system mentioned in the first embodiment.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A power system comprising:
   an electronic device;
   a power supply device comprising:
   a converter having a main power output for outputting a main voltage and a standby power output for outputting a standby voltage, wherein the standby power output is electrically connected to the electronic device; and
   a controller electrically connected to the converter;
   a power-managing module communicating with the electronic device and the power supply device, the power managing module comprising:
   a switch arranged between the main power output and the electronic device and electrically connected to the main power output and the electronic device; and
   a power manager electrically connected to the electronic device, the switch, and the controller;
   wherein when the electronic device is in a standby operation mode, the power manager makes the switch turn off to stop conducting the main voltage to the electronic device.

2. The power system of claim 1, wherein the electronic device is switched between the standby operation mode and a normal operation mode, and the power manager makes the switch turn off to stop conducting the main voltage to the electronic device after few times as the electronic device is switched from the normal operation mode to the standby operation mode.

3. The power system of claim 2, further comprising:
   a rectifier electrically connected to the controller and configured to generate a rectified power;

a power factor corrector electrically connected to the rectifier, the converter, and the controller, and configured to ensure that a current of the rectified power follows a voltage of the rectified power in time and amplitude proportionally;

a first isolating switch electrically connected to the main power output, the standby power output, and the controller for isolating transmitting signals corresponding to the main voltage and the standby voltage to the controller;

a second isolating switch electrically connected to the power manager and the controller, wherein the power manager detects currents flowing through the main power output and the standby power output, and generates a current-detecting signal for indicating that at least one of the detected currents is high than preset values, the current-detecting signal is then transmitted to the controller after passing through the second isolating switch; and a third isolating switch electrically connected to the power manager and the controller for transmitting a power-good-input signal generated by the controller to the power manager when the rectifier voltage with power factor correction is higher than a default voltage.

4. The power system of claim 3, wherein the power factor corrector is configured to ensure that the current of the rectified power follows the voltage of the rectified power in time and amplitude proportionally when the electronic device is in the standby operation mode and in the normal operation mode.

5. A power system comprising:
a power supply device comprising:
a converter having an output; and
a controller electrically connected to the converter; and
a power manager electrically connected to the converter and the controller;
an electronic device comprising:
a switch coupled to the output of the converter; and
a processor electrically connected to the output of the converter and the switch, wherein a voltage sent from the output of the converter is separated into a standby voltage and a main voltage when entering the electronic device, the standby voltage is conducted to the processor, and the main voltage is conducted to the processor when the switch is turned on,
wherein when the electronic device is operated in a standby operation mode, the power manager makes the switch turn off to stop conducting the main voltage to the processor.

6. The power system of claim 5, wherein the power manager makes the switch turn off after few times as the electronic device is switched from a normal operation mode to the standby operation mode.

7. The power system of claim 6, further comprising:
a rectifier electrically connected to the controller and configured to generate a rectified power;
a power factor corrector electrically connected to the rectifier, the controller, and the converter, and configured to ensure that a current of the rectified power follows a voltage of the rectified power in time and amplitude proportionally;
a first isolating switch electrically connected to the converter, the switch, the processor, and the controller for isolating transmitting signals corresponding to voltages transmitted to the processor and the switch;
a second isolating switch electrically connected to the power manager and the controller, wherein the power manager detects currents conducting to the switch and the processor respectively, and generates a current-detecting signal for indicating that at least one of the detected currents is high than preset values, the current-detecting signal is then transmitted to the controller after passing through the second isolating switch; and a third isolating switch electrically connected to the power manager and the controller for transmitting a power-good-input signal generated by the controller to the power manager when the rectifier voltage with power factor correction is higher than a default voltage.

8. The power system of claim 7, wherein the power factor corrector is configured to ensure that the current of the rectified power follows the voltage of the rectified power in time and amplitude proportionally when the electronic device is in the standby operation mode and in the normal operation mode.

9. A power system comprising:
a power supply device comprising:
a converter having an output;
a controller electrically connected to the converter;
an electronic device comprising:
a switch electrically connected to the output of the converter;
a processor electrically connected to the output and the switch, wherein a voltage sent from the output of the converter is separated into a standby voltage and a main voltage when entering the electronic device, the standby voltage is conducted to the processor, and the main voltage is conducted to the processor when the switch is turned on; and
a power manager electrically connected to the converter, the switch, the processor, and the controller,
wherein when the electronic device is operated in a standby operation mode, the power manager makes the switch turn off to stop conducting the main voltage to the processor.

10. The power system of claim 9, wherein the electronic device is switch between the standby operation mode and a normal operation mode, and the power manager makes the switch turn off to stop conducting the main voltage to the electronic device after few times as the electronic device is switch from the normal operation mode to the standby operation mode.

11. The power system of claim 10, further comprising:
a rectifier electrically connected to the controller and configured to generated a rectified power;
a power factor corrector electrically connected to the rectifier, the converter, and the controller, and configured to ensure that a current of the rectified power follows a voltage of the rectified power in time and amplitude proportionally;
a first isolating switch electrically connected to the switch and the processor for detecting the main voltage and the standby voltage, and the controller for isolating transmitting signals corresponding to the main voltage and the standby voltage to the controller;
a second isolating switch electrically connected to the power manager and the controller, wherein the power manager detects currents conducting to the processor and the switch respectively, and generates a current-detecting signal for indicating that at least one of the detected currents is high than preset values, the current-detecting signal is then transmitted to the controller after passing through the second isolating switch; and a third isolating switch electrically connected to the power manager and the controller for transmitting a power-good-input signal generated by the controller to the power manager when the rectifier voltage with power factor correction is higher than a default voltage.

12. The power system of claim 11, wherein the power factor corrector is configured to ensure that the current of the rectified power follows the voltage of the rectified power in time and amplitude proportionally when the electronic device is in the standby operation mode and in the normal operation mode.

* * * * *